United States Patent [19]
Matsuki

[11] 4,119,794
[45] Oct. 10, 1978

[54] COMPOSITE BOARD STRUCTURE INCLUDING CORRUGATED FIBERBOARD AND COMBINATION SURFACE-COVERING AND ELECTRICAL-WIRING ARRANGEMENT INCORPORATING THE BOARD STRUCTURE

[75] Inventor: Masamitsu Matsuki, Sagamihara, Japan

[73] Assignee: Nissan Motor Company, Ltd., Japan

[21] Appl. No.: 816,273

[22] Filed: Jul. 15, 1977

[30] Foreign Application Priority Data

Jul. 15, 1976 [JP] Japan .............................. 51-94658[U]

[51] Int. Cl.² .................. H02G 3/26; H02G 3/02; B62D 25/06
[52] U.S. Cl. .................. 174/68 R; 174/48; 296/137 A; 428/182
[58] Field of Search .................. 296/137 A, 137 R; 428/182, 183, 167; 52/220; 174/68.5, 48, 68 R, 70 R

[56] References Cited

U.S. PATENT DOCUMENTS

| | | | |
|---|---|---|---|
| 2,148,176 | 2/1939 | Schroeder | 428/182 |
| 2,857,654 | 10/1958 | Sexton | 296/137 R |
| 3,067,401 | 12/1962 | Rhodes | 174/84 S |
| 3,355,545 | 11/1967 | Kilduff et al. | 174/68.5 |
| 3,518,142 | 7/1965 | Dooley | 428/182 |
| 3,655,496 | 4/1972 | Ettre et al. | 174/68.5 |

FOREIGN PATENT DOCUMENTS

| | | | |
|---|---|---|---|
| 1,244,992 | 7/1967 | Fed. Rep. of Germany | 219/213 |
| 667,782 | 10/1929 | France | 296/137 A |

*Primary Examiner*—J. V. Truhe
*Assistant Examiner*—J. H. Bouchard

[57] ABSTRACT

A composite board structure including a corrugated fiberboard having a liner having an uncovered outer face formed with at least one length of trough-shaped depression which is adapted to have a wire harness disposed therein. The board structure is useful not only as an interior trim for the roof panel of the body structure of an automotive vehicle but as a mount for the wire harnesses connected to some electrical appliances of the vehicle.

8 Claims, 4 Drawing Figures

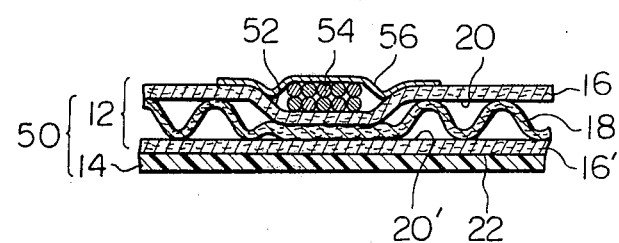
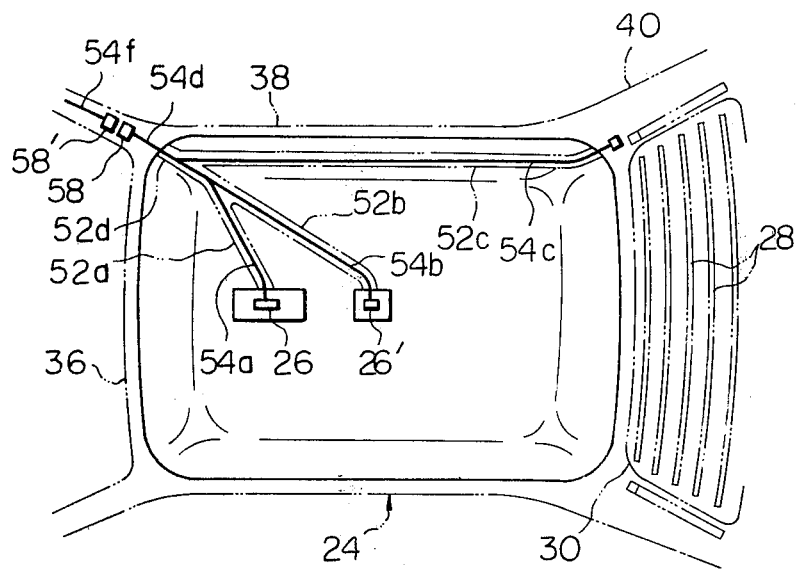

COMPOSITE BOARD STRUCTURE INCLUDING CORRUGATED FIBERBOARD AND COMBINATION SURFACE-COVERING AND ELECTRICAL-WIRING ARRANGEMENT INCORPORATING THE BOARD STRUCTURE

The present invention relates to a composite board structure which uses a corrugated fiberboard as one of the components and which is useful as a surface covering material such as, for example, an interior trim or lining for the roof panel of the body structure of an automotive vehicle. The present invention is further concerned with a combination surface-covering and electrical-wiring arrangement including such a composite board structure.

Composite board structures using corrugated fiberboards are finding various practical applications not only as packaging materials but as surface covering materials such as interior trims or linings for the roof panels of the body structures of automotive vehicles for their light-weight constructions and ease of working and handling. A corrugated fiberboard used as a component of such a composite board structure usually consists of a pair of spaced parallel liners and a corrugated paper medium which is interposed between the liners and which is bonded at the tops of its ridges to the respective inner faces of the liners by means of a hot melt or thermally fusible adhesive applied to the inner face of each of the liners. A facing web usually consisting of a sheet of non-woven fabric or synthetic resin polymer is attached also by means of a hot melt adhesive to the outer face of one of the liners of the fiberboard for reinforcing and/or decorative purposes.

For the production of a composite board structure of the above described nature, the liners, corrugated paper medium and facing web to form the board structure are superposed on each other with hot melt adhesive coatings applied to the respective inner faces of the liners and the facing web or the outer face of one of the liners and are shaped and consolidated on a hydraulically operated hot press into a single structure having a configuration conforming to the configuration of, for example, the subtly curved inner face of the roof panel of an automotive vehicle. When the stack of the sheet materials is being processed on the hot press, the stack is kept heated at a certain temperature higher than the softening point of the hot melt adhesive coatings in the stack so that the coatings are thermally fused to produce molten bonds between the corrugated paper medium and each of the liners and between one of the liners and the facing web. When the composite board structure thus shaped is removed from the hot press, the bonds of the hot melt adhesive are allowed to be set to securely unite together the individual components of the structure and maintain the configuration of the board structure. If desired, only a corrugated fiberboard may be processed on a hot press so that a flexible facing web is glued or otherwise bonded to one of the outer faces of the fiberboard which has been shaped on the press.

On the other hand, the roof panel of the body structure of an automotive vehicle is utilized as a fixture for the wire harnesses for some electric appliances of the vehicle such as for example the indicator lights on the dashboard, the interior light or lights mounted on the roof panel and the defogger lines or strips embedded in or attached to the rear window pane. These wire harnesses are usually passed through the tubular cavities in the front rail portion and one or both of the side rail portions of the roof panel for connection to the above-mentioned electric appliances. Not only laborious and time-consuming steps are therefore required for fitting the wire harnesses to such portions of the roof panel but various other problems are encountered in an automotive vehicle using the roof panel as a fixture for electrical wire harnesses when the vehicle is in use as well as during installation of the wire harnesses on the vehicle body, as will be discussed in more detail as the description proceeds.

In view of the ease of working of a composite board structure of the above described nature, especially, of the fact that the composite board structure can be easily compressed in an inelastic fashion without the risk of producing a fissure or a crease therein, the present invention contemplates utilization of such a composite board structure not only as an interior trim or lining for the roof panel of the body structure of an automotive vehicle but as a support or fixture for the wire harnesses for some electric appliances of the vehicle. While, thus, a composite board structure proposed by the present invention is especially suited to form part of a surface-covering and electrical-wiring arrangement for an automotive vehicle, a combination surface-covering and electric-wiring arrangement according to the present invention will find various other applications where the surface to be lined or covered with a composite board structure is associated with electrical-wiring arrangements.

It is, accordingly, an important object of the present invention to provide a composte board structure including a corrugated fiberboard and useful to be arranged with wire harnesses for electric appliances.

It is another important object of the present invention to provide a combination surface-covering and electrical-wiring arrangement featuring in essence a composite board structure including a corrugated fiberboard.

In accordance with one outstanding aspect of the present invention, there is provided a composite board structure comprising a corrugated fiberboard including at least one liner having inner and outer faces and at least one corrugated paper medium which is bonded at the tops of its ridges on one side of the paper medium to the inner face of the liner, and a facing web bonded to one face of the corrugated fiberboard, the outer face of the liner being left uncovered and formed with at least one length of trough-shaped depression and the corrugated paper medium being at least partially collapsed over its area substantially coextensive with the trough-shaped depression. The corrugated fiberboard may comprise a pair of liners which are spaced in parallel from each other with the above-mentioned paper medium interposed between the liners and bonded at the tops of its ridges on one side of the paper medium to the inner face of one liner and at the tops of its ridges on the other side of the paper medium to the inner face of the other liner. In this instance, the facing web is bonded to the outer face of one of the liners and the aforesaid trough-shaped depression is formed in the other of the liners. The corrugated paper medium and the facing web are bonded to the liner or liners by means of thermally fusible adhesive coatings of thermoplastic resin polymer.

In accordance with another outstanding aspect of the present invention, there is provided a combination surface-covering and electrical-wiring arrangement comprising a composite board structure consisting of a corrugated fiberboard comprising at least one liner having inner and outer faces and at least one corrugated paper medium which is bonded at the tops of its ridges on one side of the paper medium to the inner face of the liner and a facing web bonded to one face of the corrugated fiberborad, the outer face of the line being left uncovered and formed with at least one length of trough-shaped depression and the corrugated paper medium being at least partially collapsed over its area substantially coextensive with the trough-shaped depression, and at least one wire harness, viz., at least one bundle of insulated conductors mounted at least partially in the depression. The combination surface-covering and electrical-wiring arrangement according to the present invention may further comprise means for securing the bundle of conductors to the corrugated board structure. Such means may comprise at least one pressure-sensitive strip applied in part to the outer face of the liner forming part of the corrugated board structure and in part to the outer end of the bundle or a coating of non-dry pressure-sensitive adhesive applied to the surface of the depression in the liner.

The features and advantages of a composite board structure and a combination surface-covering and electrical-wiring arrangement according to the present invention will become more apparent from the following description taken in conjunction with the accompanying drawings, in which.

FIG. 3 is a cross sectional view showing a portion of a preferred embodiment of a composite board structure according to the present invention; and FIG. 4 is a plan view showing a preferred example of the arrangement in which a composite board structure having the cross sectional construction illustrated in FIG. 3 is utilized as an internal trim or lining for the roof panel of an automotive vehicle and as a fixture for wire harnesses for some electric appliances of the vehicle, viz., a preferred embodiment of a combination surface-covering and electrical-wiring arrangement according to the present invention.

Figure 1:
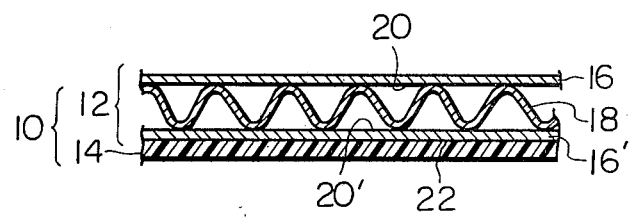
FIG. 1 is a cross sectional view showing a portion of a prior-art composite board structure using a double-faced or single-wall corrugated fiberboard.

Referring to FIG. 1 of the drawings, a known composite board structure 10 is shown comprising a double-faced or single-wall corrugated fiberboard 12 and a facing web 14 of, for example, synthetic resin polymer. The corrugated fiberboard 12 consists of a pair of spaced parallel liners 16 and 16' and a corrugated paper medium 18 which is sandwiched between the liners 16 and 16' and which is bonded at the tops of its ridges to the respective inner faces of the liners 16 and 16' by means of hot melt adhesive coatings 20 and 20' applied to the inner faces of the liners 16 and 16', respectively. The facing web 14 is bonded to the outer face of one of the liners 16 and 16' also by means of a hot-melt adhesive coating 22. The composite board structure 10 of this nature is shaped on a hydraulically operated hot press (not shown) into a compound-curved configuration to conform in its entirety to the inner face of the roof panel of an automotive vehicle.

Figure 2:
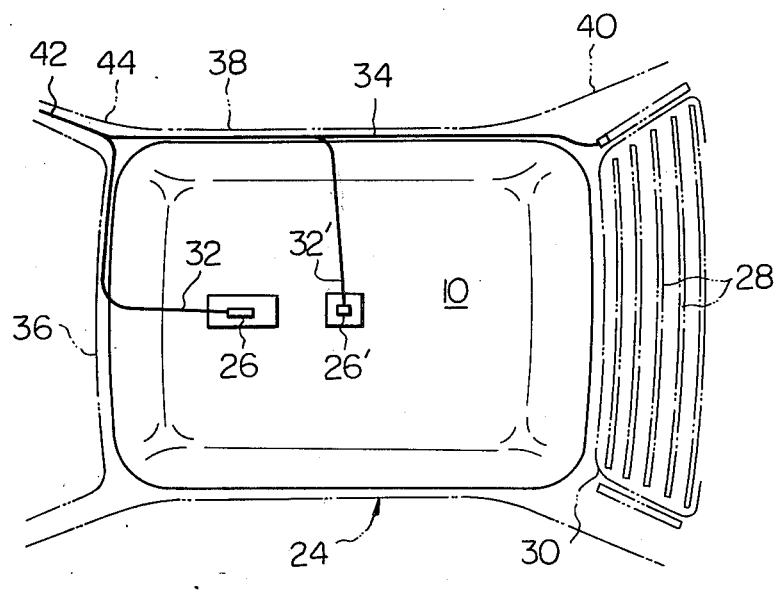
FIG. 2 is a plan view of an example of a conventional arrangement in which a composite board structure having the cross sectional construction shown in FIG. 1 is used as an internal trim or lining for the roof panel of an automotive vehicle.

FIG. 2 shows an arrangement in which the roof panel of an automotive vehicle is lined with the composite board structure 10 thus shaped, the roof panel as a whole being designated by reference numeral 24. The composite board structure 10 is attached to the roof panel 24 in such a manner as to have the uncovered liner 16 of the corrugated fiberboard 12 attached to the inner face of the roof panel 24 and have the facing web 14 exposed to the interior space within the body structure of the vehicle.

The roof panel 24 is utilized as a fixture for the wirings for various electric appliances of the vehicle such as the interior lights 26 and 26' mounted on the roof panel 24 and the defogger lines or strips 28 embedded in or attached to the rear window pane 30. Such wirings include wire harnesses 32 and 32' connected to the interior lights 26 and 26', respectively, and a wiring harness 34 connected to the defogger lines or strips 30 on the rear window pane 30. The wire harness 32 for one interior light 26 is shown to be in part passed between the underside of the roof panel 24 and the interior trim or lining constituted by the composite board structure 10 and in part through the tubular cavity in the front rail portion 36 of the roof panel 24, and the harness 32' for the other interior lights 26' is passed in part between the underside of the roof panel 24 and the interior trim or composite board structure 10 and in part through the elongated cavity in one side rail portion 38 of the roof panel 24. The wire harness 34 connected to the defogging liners or strips 28 is passed in part through the elongated cavity in the side rail portion 38 of the roof panel 24 and in part through the tubular cavity in a rear pillar 40 forming part of the vehicle body structure. The wire harnesses 32, 32' and 38 are bundled into a single harness 42 which is passed through a front pillar 44 also forming part of the vehicle body structure for connection to the battery (not shown) installed on the vehicle.

To have the wire harnesses 32, 32' and 34 fitted into the front and side rail portions 36 and 38 of the roof panel 24, laborious and time-consuming steps are required on the part of the manufacturer of the vehicle and increase the production cost of the vehicle. Because, furthermore, the wire harnesses 32, 32' and 34 thus fitted to the front and side rail portions 36 and 38 of the roof panel 24 cannot be clamped to such portions, the wire harnesses encased within the rail portions are left unfastened to the roof panel 24 and as a consequence beat on the roof panel when vibrations are transferred to the vehicle body, producing rustling noises when the vehicle is in operation. If the wire harnesses 32, 32' and 34 are forcibly fitted into the rail portions for being snugly received in the rail portions 36 and 38 of the roof panel 24 to preclude production of such noises, then the insulating coatings of the wires constituting the harnesses are liable to be scraped off on the rugged inner surfaces of the rail portions 36 and 38 and may form short circuits therebetween. From the economical point of view, furthermore, using the rail portions 36 and 38 of the roof panel 24 as the conduits for the wire harnesses is objectionable in that the wire harnesses must run disproportionately long distances on the roof panel 24 and as a consequence disproportionately elongated wires must be used. The present invention contemplates elimination of these problems by using a composite board structure incorporating a corrugated fiberboard not only as an interior trim or lining for the roof panel of an automotive vehicle but as a fixture or mount for the wire harnesses for some electrical accessories of the vehicle.

Referring to FIG. 3, a composite board structure 50 embodying the present invention is shown to have a basic construction essentially similar to the prior-art composite board structure 10 illustrated in FIG. 1. The composite board structure 50 thus comprises a double-faced or single-wall corrugated fiberboard 12 consisting of a pair of spaced parallel liners 16 and 16' and a corrugated paper medium 18 interposed between the liners 16 and 16' and bonded at the tops of its ridges on one side of the paper medium 18 to the inner face of one liner 16 by means of a hot melt adhesive coating 20 and at the tops of its ridges on the other side of the paper medium 18 to the inner face of the other liner 16' by means of a hot melt adhesive coating 20'. The composite board structure 50 further comprises a facing web 14 which is bonded to the outer face of the liner 16' with a hot melt adhesive coating 22. The facing web 14 is assumed to be formed of a synthetic resin polymer but may be constituted by a sheet of non-woven fabric. Each of the hot melt adhesive coatings 20, 20' and 22 is formed of a thermoplastic resin polymer such as for example polyethylene.

One liner 16 of the corrugated fiberboard 12 forming part of the composite board structure 50 has its outer face left uncovered and is partially formed with at least one length of trough-shaped depression 52 having a shallow U-shaped cross section. The depression 52 may be formed by compressing the composite board structure 50 in a direction normal to the outer face of the liner 16 with the facing web 14 attached to a flat surface of a hard plate or block. The corrugated paper medium 18 of the fiberboard 12 is thus partially collapsed over its area substantially coextensive with the trough-shaped depression 52.

A wire harness 54 which is constituted by a bundle of low-voltage conductors insulated with vinyl coatings is mounted at least partially in the depression 52. The wire harness 54 may be secured to the liner 16 by means of a pressure-sensitive adhesive tape 56 applied in part to the outer face of the liner 16 and in part to the outer end of the wire harness 54 as shown or by means of a non-drying pressure-sensitive coating (not shown) applied to the surface of the depression 52.

Turning to FIG. 4, the composite board structure 50 having the cross sectional construction illustrated in FIG. 3 is shown to be attached to the inner face of the roof panel 24 of the body structure of an automotive vehicle. The composite board structure 50 thus used as an interior trim or lining for the roof panel 24 is assumed to be formed with three lengths of trough-shaped depressions 52a, 52b and 52c which jointly merge into a single trough-shaped depression 52d having an end located at a corner edge portion of the board structure 50 in the vicinity of the front pillar 44 of the vehicle body structure. The depressions 52a and 52b extend from the depression 52d and terminate in the vicinity of the interior lights 26 and 26', respectively, on the roof panel 24. Thus, the depressions 52a and 52b have received therein wire harnesses 54a and 54b connected to the interior lights 26 and 26', respectively. On the other hand, the depression 52c has received therein a wire harness 54c connected to the defogger lines or strips 28 on the rear window pane 30 and thus extends alongside one side edge of the composite board structure 50 and terminates in a corner edge portion of the board structure 50 in the vicinity of the rear pillar 40 of the vehicle body structure as shown. The wire harnesses 54a, 54b and 54c are bundled into a single wire harness 54d which is partly received in the depression 52d and partly inserted into the front pillar 44 of the vehicle body structure. The wire harness 54d thus passed into the front pillar 44 may be extended, possibly across suitable switches, to the battery installed on the vehicle though not shown in the drawings. To offer ease in the wiring works during assemblage of the vehicle body structure, the wire harness 54d is preferably connected at its leading end to a suitable connector 58 which is adapted to be readily fitted to the front pillar 44. In this instance, a wire harness 54f initially separate from the wire harness 54d and connected to the battery (not shown) of the vehicle possibly across suitable switches (not shown) is connected to a connector 58' which is fitted to the front pillar 44 and which is adapted to be readily coupled with the connector 58 at the end of the wire harness 54d extending from the composite board structure 50.

From the foregoing description it will have been appreciated that a combination surface-covering and electrical-wiring arrangement according to the present invention has the following advantages:

(1) Since the depressions to accommodate the wire harnesses therein can be formed with any desired pattern in the corrugated fiberboard forming part of the composite board structure, the lengths of the wire harnesses can be minimized to reduce the total production cost of the wiring arrangement of an automotive vehicle.

(2) The wiring works for an automotive vehicle can be significantly simplified because the wire harnesses need not be forcibly fitted to rail portions of the roof panel of the vehicle body structure but may be merely disposed in the depressions formed in the corrugated fiberboard.

(3) For the same reason as in paragraph (2), the insulations of the conductors constituting the wire harnesses are not destroyed during wiring works and as a consequence the insulated conductors are precluded from forming a short circuit therebetween.

(4) The wire harnesses can be securely fastened to the upper face of the interior trim of the roof panel by the use of suitable adhesive means such as pressure-sensitive tapes or non-drying pressure-sensitive adhesive coatings so that the harnesses are prevented from being shaken by the vibrations transferred thereto when the vehicle is in operation.

(5) Each of the harnesses disposed in the depressions in the corrugated fiberboard is totally accommodated within the depression or only slightly protrudes from the depression so that the interior trim for the roof panel can be intimately attached to the underside of the roof panel or only slightly and partially spaced apart from the inner face of the roof panel.

While the corrugated fibarboard forming part of the composite board structure embodying the present invention has been assumed to be of the double-faced or single-wall type having two liners and a single corrugated paper medium between the liners, the corrugated fiberboard forming part of a composite board structure according to the present invention or of the composite board structure forming part of a combination surface-covering and electrical-wiring arrangement according to the present invention may be of the single-faced type consisting of a single liner and a single corrugated paper medium or of the double-wall or triple-wall construction consisting of three or four liners with at least one corrugated paper medium interposed between every adjacent two of the liners.

What is claimed is:

1. A combination surface-covering and electrical-wiring arrangement for use on the inner face of a rigid roof panel of an automotive vehicle, comprising
    a composite board structure consisting of a corrugated fiberboard comprising at least one liner having inner and outer faces and at least one corrugated paper medium which is bonded at the tops of its ridges on one side of the paper medium to the inner face of said liner, and
    a facing web bonded to one face of said corrugated fiberboard,
    the outer face of said liner being left uncovered and formed with at least one length of trough-shaped depression extending irrespective of the directions of said ridges and said corrugated paper medium being at least partially collapsed over its area substantially coextensive with the trough-shaped depression, and
    at least one wire harness mounted at least partially in said depression.

2. A combination surface-covering and electrical wiring arrangement as set forth in claim 1, further comprising a layer of a thermoplastic adhesive material between said liner and said corrugated paper medium for bonding the paper medium to the inner face of the liner at the tops of said ridges of the paper medium, and a layer of a thermoplastic adhesive material between said liner and said facing web for bonding the facing web to said one face of the corrugated fiberboard.

3. A combination surface-covering and electrical wiring arrangement as set forth in claim 1, in which said corrugated fiberboard comprises a pair of liners which are spaced in parallel from each other with said paper medium interposed between the liners and bonded at the tops of its ridges on one side of the paper medium to the inner face of one liner and at the tops of its ridges on the other side of the paper medium to the inner face of the other liner, said facing web being bonded to the outer face of one of the liners and said trough-shaped depression being formed in the other of the liners.

4. A combination surface-covering and electrical wiring arrangement as set forth in claim 1, in which said liner is, over its area formed with said depression, compressed in a direction substantially normal to said inner and outer faces of the liner.

5. A combination surface-covering and electrical-wiring arrangement as set forth in claim 1, further comprising means securing said wire harness to said liner.

6. A combination surface-covering and electrical-wiring arrangement as set forth in claim 5, in which said means comprises at least one pressure-sensitive adhesive strip applied in part to the outer face of said liner and in part to the outer end of said wire harness.

7. A combination surface-covering and electrical-wiring arrangement as set forth in claim 5, in which said means comprises a non-drying pressure-sensitive adhesive coating applied to the outer surface of said depression.

8. A combination surface-covering and electrical-wiring arrangement as set forth in claim 1, further comprising an electric connector to which said wire harness is connected at its leading end outside said composite board structure, said connector being adapted to be coupled with an electric connector connected to an electric circuit to be connected to said wire harness.

* * * * *